(No Model.)
F. A. KNOX.
TWO WHEELED VEHICLE.
No. 303,738. Patented Aug. 19, 1884.
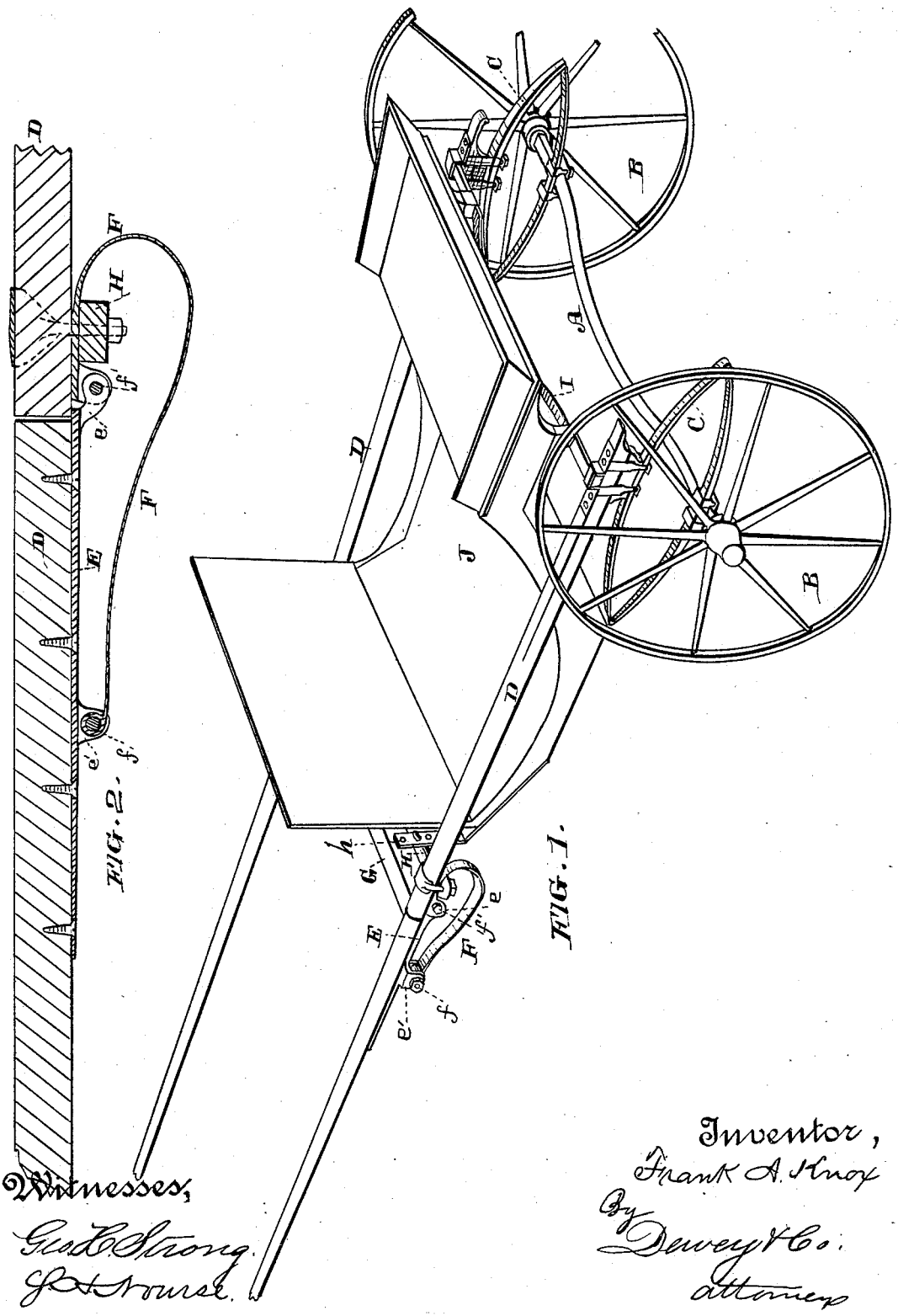
Witnesses,
Geo. H. Strong.
J. A. Nourse.
Inventor,
Frank A. Knox
By Dewey & Co.
Attorneys

UNITED STATES PATENT OFFICE.

FRANK A. KNOX, OF WOODLAND, CALIFORNIA.

TWO-WHEELED VEHICLE.

SPECIFICATION forming part of Letters Patent No. 303,738, dated August 19, 1884.

Application filed April 8, 1884. (No model.)

*To all whom it may concern:*

Be it known that I, FRANK A. KNOX, of Woodland, county of Yolo, and State of California, have invented an Improvement in Two-Wheeled Vehicles; and I hereby declare the following to be a full, clear, and exact description thereof.

My invention relates to that class of two-wheeled vehicles commonly known as "carts," and particularly to the shafts or thills thereof and their connection with the body of the vehicle.

My invention consists in severed shafts, the adjoining ends of which are connected by a peculiar spring-hinge. The rear portions of the shafts form a support or frame for the body, as I shall hereinafter fully explain.

The object of my invention is to relieve that unpleasant motion which the rider experiences as a result of the jogging of the horse.

Referring to the accompanying drawings, Figure 1 is a perspective view of my vehicle. Fig. 2 is a longitudinal vertical section of a shaft, showing the spring attachment.

A is the axle, and B are the wheels. Upon the axle are clipped rigidly the elliptical springs C.

D D are the shafts. Each of these is severed at a point just in front of the body, and the adjoining ends are hinged in the following manner: An iron strap, E, is bolted under the forward portion of the shaft, and its rear end, extending a trifle back of the line of separation of the two portions, is thickened to form a bearing, $e$. Another bearing, $e'$, is formed on it nearer its forward end.

F is a flat spring, the forward end of which is pivoted to the bearing $e'$ by means of a bolt, $f$. Its body is curved downwardly and extends backwardly, its rear end being curved upwardly and forwardly under the rear portion of the shaft to the bearing $e$, to which it is pivoted by a bolt, $f'$.

G is the cross-bar between the shafts, which carries the whiffletree.

H is a bar clipped under the rear portion of the shafts in the loop formed by the rear ends of the springs F, the securing-clips serving also to unite the springs to the rear portions of the shafts. The rear portions of the shafts are carried back and are clipped to the top of the elliptical springs C. On top of these, and extending transversely, is clipped a bar, I, on which the rear portion of the body J rests and is secured properly. The forward portion of the body is connected with transverse bar H by body-loops $h$, having a series of holes for different adjustments. It will be seen from this construction that, by reason of the severed shafts, the motion imparted by the horse to their forward ends is not transmitted to the body of the vehicle, and at the same time a connection is made between the severed ends, whereby the body is prevented from turning over on the axle as a center. This connection, by being made yielding, is sufficient to accomplish both the results which I have indicated. The union of the rear ends of the springs F with the bearings $e$ forms a hinge for allowing an independent motion to the forward portion of the shafts, while the springs themselves furnish a limit, though a yielding one, to the operation of the hinge.

The construction I have here shown—namely, the springs F, forming the yielding hinge for the severed shafts—is neat in appearance, and simple and durable in operation. These shafts may be applied to many forms of carts now used independent of the particular connection with the main portion of a vehicle such as I have shown, though I consider the whole vehicle as described a good one.

I am aware that the shafts of two-wheeled vehicles have been severed and the adjoining ends united by a limited hinge, and I do not therefore claim such, broadly; but What I do claim as new, and desire to secure by Letters Patent, is—

1. In a two-wheeled vehicle, the shafts D D, severed, as shown, and united by a hinge in the rear of the point of separation, in combination with the springs F, the forward ends of which are pivoted under the forward portions of the shafts, and their rear ends secured to the rear portions of the shafts, substantially as and for the purpose herein described.

2. In a two-wheeled vehicle, the shafts D D, severed, as shown, in combination with the strap-irons E, having bearings $e$ $e'$, and bolted under the forward portions of the shafts, and the springs F, the forward ends of which are pivoted to bearings $e'$, and the rear ends secured to rear portions of the shafts, and pivoted to bearings $e$ in the rear of the point of separation, and forming a hinge, substantially as and for the purpose herein described.

3. In a two-wheeled vehicle, the axle A, and springs C, clipped thereto, in combination with the shafts D D, severed, as shown, and having their adjoining ends united by the straps E and springs F, as described, the rear portions of the shafts being clipped to springs C, the cross-bar H, clipped to the forward ends of the rear portions of the shafts, the body-bar I between their rear ends, and the body J, supported on said bars, substantially as herein described.

In witness whereof I have hereunto set my hand this 18th day of March, A. D. 1884.

FRANK A. KNOX.

Witnesses:
F. E. BAKER,
BYRON BALL.